United States Patent [19]

Orchard

[11] Patent Number: 4,560,323
[45] Date of Patent: Dec. 24, 1985

[54] APPARATUS FOR CONTROLLING THE FLOW OF A FLUID

[76] Inventor: William R. H. Orchard, 3 North View, Wimbledon Common, London SW19, England

[21] Appl. No.: 346,064

[22] PCT Filed: May 13, 1981

[86] PCT No.: PCT/GB81/00085
§ 371 Date: Jan. 13, 1982
§ 102(e) Date: Jan. 13, 1982

[87] PCT Pub. No.: WO81/03361
PCT Pub. Date: Nov. 26, 1981

[30] Foreign Application Priority Data
May 13, 1980 [GB] United Kingdom ............... 8015756

[51] Int. Cl.⁴ .......................................... F04B 49/00
[52] U.S. Cl. ........................................ 417/27; 60/419; 60/648; 417/28; 417/41; 417/46; 417/63
[58] Field of Search ............... 60/490, 419, 648; 417/410, 501, 374, 46, 40, 41, 63, 27, 28; 237/12.1, 66, 8 R, 56

[56] References Cited

U.S. PATENT DOCUMENTS

| 1,015,464 | 1/1912 | Wilkins ............................ 417/46 |
| 1,353,216 | 9/1920 | Carlson ........................... 417/401 |
| 1,972,571 | 9/1934 | Musil ............................. 237/12.1 X |
| 2,208,157 | 7/1940 | Grutzner ......................... 237/12.1 X |
| 2,888,810 | 6/1959 | Hann ............................... 417/374 X |
| 2,932,257 | 4/1960 | Lupin .............................. 60/419 X |
| 3,054,263 | 9/1962 | Budzich et al. ................. 60/490 X |
| 3,365,133 | 1/1968 | Norton et al. ................. 237/12.1 X |
| 3,589,839 | 2/1968 | Johnson . |
| 3,851,661 | 12/1974 | Fernandez ........................ 417/540 |
| 4,013,385 | 3/1977 | Peterson . |
| 4,021,149 | 5/1977 | Rutenberg et al. . |
| 4,221,543 | 9/1980 | Cosentino ........................ 417/22 |
| 4,336,001 | 6/1982 | Andrew et al. ................... 417/63 |

FOREIGN PATENT DOCUMENTS

| 344842 | 7/1931 | United Kingdom . |
| 1212917 | 2/1968 | United Kingdom . |
| 1595787 | 11/1970 | United Kingdom . |

OTHER PUBLICATIONS

"Gasoline Alley" Comic, *The Washington Post*, Sep. 7, 1930.
European Search Report, EP 81 30 2107; The Hagus, 05-08-1981.

*Primary Examiner*—Edward K. Look
*Attorney, Agent, or Firm*—Cushman, Darby & Cushman

[57] ABSTRACT

An apparatus for controlling flow of a fluid having two speed-controlled positive displacement devices for supplying a load with fluid under pressure from a supply at a different pressure with interposed variable-volume buffer containers.

4 Claims, 10 Drawing Figures

APPARATUS FOR CONTROLLING THE FLOW OF A FLUID

This invention relates to apparatus for controlling the flow of a fluid and in particular to apparatus employing a positive displacement device for controlling the flow of a fluid.

By the term "positive displacement device" we mean a device having an inlet and an outlet and at least one movable member which moves to displace fluid, the arrangement being such that the amount of fluid displaced is proportional to the amount by which the member is moved and that when the member is held stationary, substantially no fluid flows from the inlet to the outlet.

According to the present invention, there is provided apparatus for controlling flow of a fluid, including two positive displacement devices through which the fluid passes, and means for applying power to at least one of the positive displacement devices to drive the fluid through the apparatus.

Advantageously the two positive displacement devices are linked together. In that case the means for applying power can be dispensed with and at least one of the devices can be driven by fluid pressure.

With these arrangements, it is possible to control the pressures at input to and output from both of the devices by controlling the speeds at which the devices operate.

Desirably therefore the apparatus includes control means for controlling the speeds at which the devices operate. The control means may comprise a motor coupled to at least one of the devices.

According to the present invention, there is provided apparatus for controlling flow of a fluid including two positive displacement devices of which one is a motor arranged to be driven by the fluid and the other is a pump arranged to drive the fluid, and means to control the speed of at least one of the positive displacement devices so as to control the flow of fluid through the apparatus.

With this arrangement, it is possible to control the pressures at input to and output from the apparatus be variation of the speeds at which the positive displacement devices operate.

There is also provided according to the present invention apparatus for controlling flow of a fluid including two positive displacement devices of which one is a motor arranged to be driven by the fluid and the other is a pump arranged to drive the fluid, and a source of power arranged to be applied to at least one of the positive displacement devices.

Alternatively, the positive displacement devices may both be pumps. Or the positive displacement devices may both be motors. In that case it may be possible to dispense with the source of power.

In one arrangement, the incoming fluid flows first to the motor and then to the pump.

Alternatively, the arrangement is such that the incoming fluid flows first to the pump and then to the motor. With this arrangement the apparatus can be used to pump fluid to a height against gravity, e.g. to the top of a hill or high building. Also, the apparatus can receive fluid from a height and can reduce the pressure imposed on the fluid by gravity.

Advantageously means are provided for detecting the amount of movement performed by the movable member of at least one of the positive displacement devices.

With this arrangement the volume of fluid passing through the said one positive displacement device can be metered.

Conveniently means are provided for measuring fluid temperatures at inlet to and outlet from the apparatus.

With this arrangement the amount of heat taken from the fluid can be measured.

Desirably the apparatus includes means for detecting a leak of fluid from the apparatus. Preferably there are means for locking the apparatus stationary in case of such a leak. Preferably there are also means for preventing fluid from entering or leaving the apparatus in case of such a leak.

Advantageously means are included for limiting the maximum speed at which at least one of the positive displacement devices can operate.

Conveniently, the arrangement is such that the movable members of the positive displacement devices operate at a single, constant speed and control of fluid passing through the apparatus is achieved by alternation between operating the members at the said constant speed and keeping them stationary.

With this arrangement, the positive displacement devices can be set for maximum accuracy of metering at the said one constant speed and the problem of metering inaccuracies at other speeds does not arise.

Desirably one of the positive displacement devices is arranged to discharge fluid to a container capable of accepting a varying volume of the fluid. Advantageously, the container is a buffer tank.

Conveniently the container is arranged to accept fluid intermittently from the said one of the positive displacement devices but to deliver fluid continuously to a load.

Advantageously, the apparatus includes switching means arranged to cause at least the said one of the positive displacement devices to cease discharging fluid to the container when a predetermined greater volume of fluid is in the container, but to re-start discharing fluid to the container when a pre-determined lesser volume of fluid is in the container.

Desirably the said switching means are arranged to cause the said one of the positive displacement devices to cease discharging fluid and are arranged, after a delay, to cause valves to close to prevent fluid from entering or leaving the apparatus.

Conveniently the apparatus includes a second container capable of accepting a varying volume of the fluid from the first container, the second container being connected to the other positive displacement device so that the said other positive displacement device is supplied with fluid from the second container. The second container may be a second buffer tank.

Advantageously the apparatus includes additional switching means arranged to detect the presence of a predetermined small volume of fluid in the second container and to allow additional fluid into the second container when the volume of fluid in it drops to the said predetermined small volume.

Desirably the apparatus includes further switching means arranged to detect the presence of a predetermined very small volume of fluid in the second container and to stop the apparatus from operating when the volume of fluid in the second container drops to the said predetermined very small volume.

Conveniently the first container is arranged above the load to deliver fluid to the load under gravity. Advantageously the second container is arranged below the load to accept fluid from the load under gravity.

Desirably the first container is air tight and includes means for allowing its total volume to vary as the amount of fluid in it varies. Conveniently both the containers are air tight and joined by an air duct through which air moves between them to take up the volumes in them not occupied by the fluid.

As an alternative to the two containers being arranged at different heights to enable fluid to pass between them under gravity, the one said container or one of the two containers, may be pressurized. Desirably the pressurisation is by means of a constant force spring acting on a diaphragm. Advantageously both the containers are pressurized to different pressures. Conveniently the two containers are arranged adjacent to one another with a movable barrier between them such that as one container increases in volume the other container decreases in volume and vice versa.

Instead of controlling the passage of fluid through the apparatus by alternation between operating the movable members at the said constant speed and keeping them stationary, the apparatus may include means for varying the speed at which the movable members operate. These may include means for varying the ratio at which the two positive displacement devices are linked together.

The means for controlling the movable members may include a motor coupled to at least one of the movable members and arranged to vary in speed. Alternatively the motor may be a constant speed motor such as a constant speed electric motor. The coupling between the movable members and the means for controlling the movable members is desirably such that the movable members cannot move if the means for controlling them is stationary. A geared coupling such as a worm and pinion gear is suitable.

Conveniently a motor is provided which is operatively connected to the link between the two positive displacement devices such that operation of the motor alters the ratio between the two positive displacement devices. The motor may also be arranged to provide power to the apparatus to drive at least one of the positive displacement devices.

The version of the apparatus including means for varying the speed at which the movable members operate may include one or more containers as defined above, the container or containers being able to contain varying volumes of fluid.

The movable members are desirably pistons sliding in cylinders.

The movable members of the two positive displacement devices may be rigidly linked together. With this arrangement frictional losses are reduced.

Desirably the positive displacement devices include valves having resilient seats. With this arrangement better sealing is achieved.

Advantageously the apparatus includes means for sensing and controlling the differential pressure between two points in the apparatus. These means may include a brake for braking one of the positive displacement devices. Alternatively the means may include means responsive to the pressure at one point in the apparatus to vary the ratio between the two positive displacement devices.

Conveniently the apparatus includes means for detecting at least one pressure in the apparatus and conveying this information to a remote point. Fibre optics may be used for conveying the information.

According to the present invention also, there is provided apparatus including two positive displacement devices, the apparatus being arranged to be connected to two high fluid pressures at the inlet to the first device and the outlet from the second device and to deliver two lower fluid pressures at the outlet to the first device and the inlet to the second device.

With this arrangement the high pressure from a main is prevented by the positive displacement devices from reaching the low-pressure side of the apparatus. Means can be provided for storing a differential pressure at the low-pressure side of the apparatus. These may include fluid containers at different levels. Or they may include fluid containers with movable walls acted on by resilient means.

Also according to the present invention there is provided apparatus including two positive displacement devices arranged to be connected to two fluid pressures as defined above, the apparatus being arranged to convert a first average pressure at the high pressure side to a desired second average pressure at the low-pressure side.

Desirably the apparatus is also arranged to convert a first differential pressure at the high-pressure side to a desired second differential pressure at the low-pressure side.

Also according to the present invention there is provided apparatus of the kind defined above but including only one positive displacement device.

The apparatus described and defined above is particularly suitable for incorporation in a district heating system. The present invention also includes, therefore, all forms of the apparatus defined and described above when used in a district heating system. The invention also includes a district heating system incorporating any form of the apparatus defined and described above.

In particular there is provided according to the present invention a district heating system in which water is propelled by a plurality of apparatuses as defined and described above. This avoids the need for a large central pump.

Also according to the present invention there is provided apparatus including two positive displacement devices which are provided with tight seals so as to pass substantially no fluid when stationary.

With this arrangement in a district heating system, great volumetric accuracy is achieved but there is still adequate power available to drive the tightly sealed devices.

Embodiments of the invention will now be described by way of example with reference to the accompanying drawings, in which.

Figure 1:
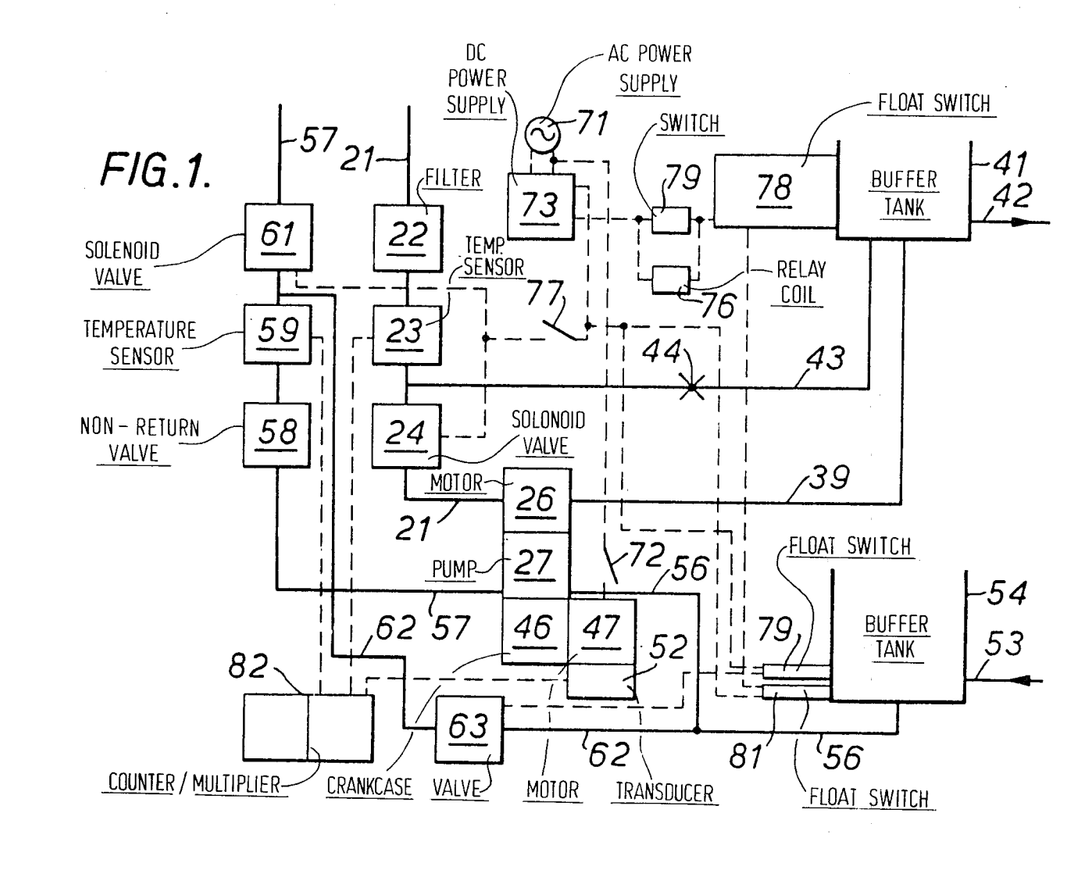
FIG. 1 is a block diagram of flow control apparatus.

Referring to the drawings and in particular to FIG. 1, there is shown a pipe 21 carrying hot water from the supply main of a district heating system into a dwelling. The pipe 21 connects the hot water from the district heating system to a filter 22 and thence to a temperature sensor 23. From the temperature sensor 23 the pipe leads through a normally closed solenoid valve 24 to a positive displacement device constituted by a hydraulic motor 26.

Figure 2:
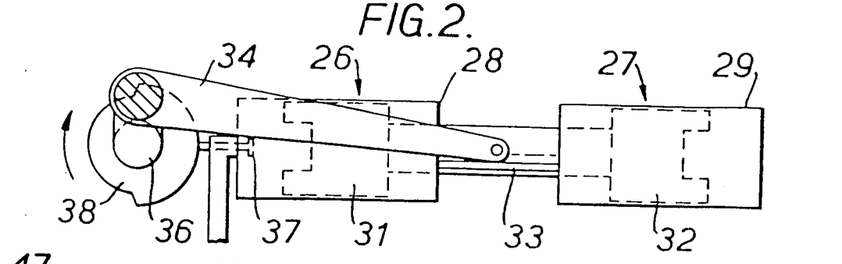
FIG. 2 is a side elevational view of part of the apparatus of FIG. 1.
Figure 3:
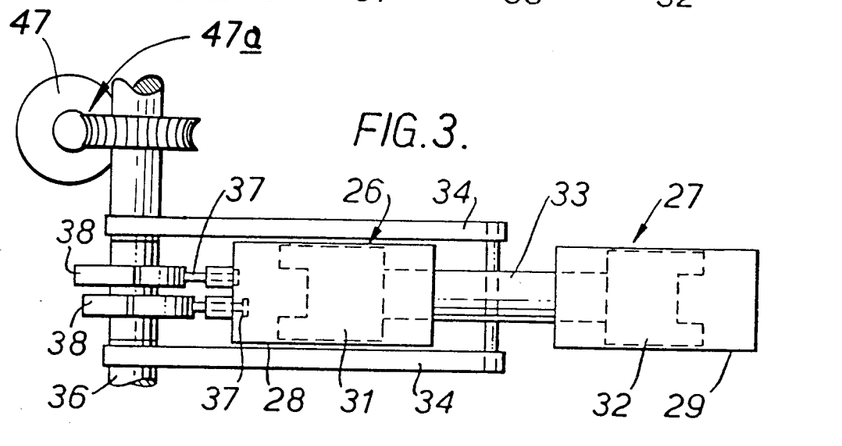
FIG. 3 is a plan view of the apparatus of FIG. 2.

The motor 26 co-operates with a second positive displacement device constituted by a hydraulic pump 27 (FIGS. 2 and 3). The motor 26 and pump 27 each have three cylinders; one cylinder 28 of the motor 26 and one cylinder 29 of the pump 27 are shown in FIGS. 2 and 3. Pistons 31 and 32 slide in the cylinders 28 and 29 respectively, pressure-tight seals being obtained by the use of cup washers, 'O' rings or piston rings (not shown). The pistons 31 and 32 are connected together rigidly by a member 33, which is connected by a pair of connecting rods 34 to a crankshaft 36. The pistons of the other two cylinders of the motor 26 are similarly connected rigidly to corresponding pistons of the pump 27 by members 33, and the three members 33 are connected to the crankshaft 36 by connecting rods 34, in similar manner to that shown in FIGS. 2 and 3.

The motor 26 and pump 27 have valves to permit the entry and exit of fluid to and from the cylinders 28 and 29. The valves of the pump 27 (not shown) are conventional automatic valves.

The motor 26 has valves 37 operated by cams 38 carried by the crankshaft 36. The pipe 21 (FIG. 1) is connected to the inlet valve of the motor 26, and a pipe 39 leads from the exhaust valve of the motor 26 to a hot water buffer tank 41. A pipe 42 connects the tank 41 to the heating system of the dwelling, which consists of a number of radiators (not shown) and an indirect coil in a tank for heating the domestic hot water.

A pipe 43, normally closed by a stop cock 44, connects the pipe 21 to the tank 41 as shown in FIG. 1.

The motor 26 and pump 27 have a common crankcase 46 (FIG. 1) on which is mounted an electric motor 47. The electric motor 47 is a constant speed squirrel cage induction motor. The electric motor 47 is connected to the crankshaft 36 of the hydraulic motor 26 and pump 27 by gearing such as a worm and pinion gear 47a (FIG. 3), which allows the motor 47 to drive the crankshaft 36, but which does not transmit torque in the other direction and so does not allow the crankshaft 36 to rotate unless the motor 47 is also rotating.

Figure 4:
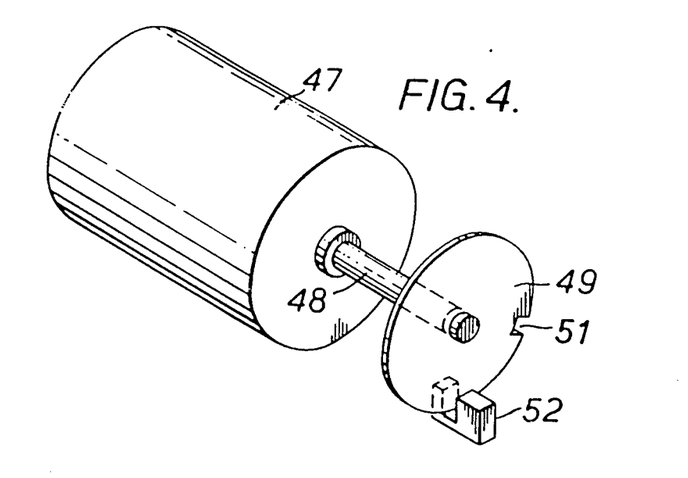
FIG. 4 is a side elevational view of a motor, being part of the apparatus of FIG. 1.

The motor 47 (FIG. 4) has a shaft 48 which rotates with the motor 47 and carries a disc 49 formed with a slot 51. A photo-electric transducer 52 interacts with the slot 51 in the disc 49 to generate a pulse at each revolution of the motor 47.

A return pipe 53 leads from the heating system of the dwelling to a warm water buffer tank 54. A pipe 56 connects the tank 54 to the inlet valve of the pump 27.

The exhaust valve of the pump 27 is connected by a pipe 57 through a non-return valve 58, a temperature sensor 59 and a normally closed solenoid valve 61 back to the return main of the district heating system. A filter (not shown) would be provided between the pipe 57 and the return main.

A pipe 62, normally closed by a solenoid valve 63, provides a fluid connection as shown in FIG. 1 between the tank 54 and the pipe 57 at a point between the sensor 59 and the valve 61. The pipe 62 includes a restrictor (not shown) to restrict the flow of water through it to a low rate even when the valve 63 is open.

Figure 5:
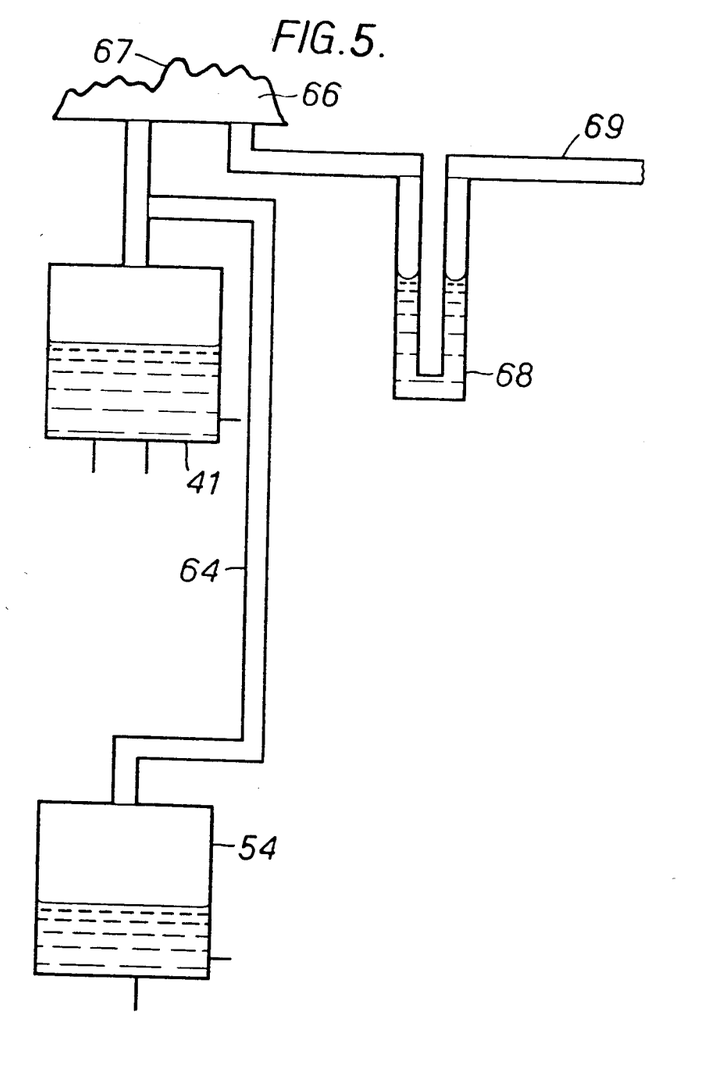
FIG. 5 is a side elevation view showing connections between two tanks which are part of the apparatus of FIG. 1.

FIG. 5 shows detail of the connections between the two buffer tanks 41 and 54 which, for clarity, are not shown in FIG. 1. The tanks 41 and 54 have air spaces in their uppermost portions, these air spaces communicating with each other through a pipe 64. The pipe 64 communicates with a chamber 66. The upper wall of the chamber 66 is a flexible rubber membrane 67, which is normally in a collapsed condition as shown in FIG. 5 but which can expand to a taut condition to increase the volume of the chamber 66 if the air or the water in the tanks 41 and 54 should expand. The chamber 66 is connected through a water-filled U-trap 68 to an overflow pipe 69.

The presence of the membrane 67 and the U-trap 68 prevent the access of oxygen to the water in the system. At the same time, air can move between the tanks 41 and 54 through the pipe 64 to compensate for varying water levels in the tanks 41 and 54 as water moves through the apparatus and through the heating system of the dwelling. Changes in total system volume, for instance caused by thermal expansion of both air and water, or by inequalities of water entering the system from that leaving the system, are accommodated by expansion or contraction of the membrane 67 of the chamber 66. The pipe 69 provides an overflow in case of emergency.

An AC power supply 71 is connected through relay contacts 72 to the motor 47, electrical connections being shown by broken lines in FIG. 1. The power supply 71 also powers a DC power supply 73. The DC power supply 73 has connected to it a relay coil 74 which operates relay contacts 77. The relay contacts 77, as shown in FIG. 1, control the supply of power to the solenoid valves 24 and 61 from the DC power supply 73. The tank 41 is fitted with a float switch 78. The float switch 78 has a large hysterisis and is arranged to close when the water level in the tank 41 falls to a predetermined low point, and to open when the water level in the tank 41 rises to a predetermined high point.

The tank 54 is fitted with a low level float switch 79 and an emergency level float switch 81. The switch 79 is connected between the power supply 73 and the solenoid valve 63. If the water level in the tank 54 falls to that of the switch 79, the switch 79 closes, supplying power to the solenoid valve 63 and causing the valve 63 to open. If the water level is above that of the switch 79, the switch 79 opens, allowing the valve 63 to close. The switch 81 is connected in series between the power supply 73 and the large hysterisis float switch 78. Provided the water level in the tank 54 is above the switch 81, the switch 81 remains closed, and current from the power supply 73 can flow to the float switch 78. When the float switch 78 is closed, the current from the power supply 73 can pass through the switch 78 to the relay coils 74 and 76, causing the relay contacts 72 and 77 to close and power to be supplied to the motor 47 and the solenoid valves 24 and 61, causing the motor 47 to start rotating and the solenoid valves 24 and 61 to open. However if the water level in the tank 54 is at or below the level of the switch 81, the switch 81 opens and current from the power supply 73 cannot reach the float switch 81. Hence no current can reach the relay coils 74 and 76, the relay contacts 72 and 77 remain open and power is cut off from the electric motor 47, which cannot rotate, and from the solenoid valves 24 and 61, which close.

A counter and multiplier 82 is connected electrically to the temperature sensors 23 and 59, and to the photoelectric transducer 52.

The operation of the apparatus is as follows.

Hot water from the supply main of the district heating system is connected to the pipe 21. Initially the tanks 41 and 54 are empty and the float switch 81 is therefore open. Hence the electric motor 47 cannot rotate and the valves 24 and 61 remain closed, isolating the apparatus from the district heating system.

The motor 26 and the pump 27 are held stationary by the fact that the electric motor 47 is stationary. The worm and pinion gearing (not shown) between the motor 47 and the crankshaft 36 (FIG. 3) prevents the motor 26 and pump 27 from moving when the electric motor 47 is stationary.

To fill the apparatus, the stop cock 44 is opened manually, allowing hot water to flow from the pipe 21 into the tank 41 and thence to the heating system of the dwelling and the tank 54. Once the apparatus has been adequately filled with hot water, the stop cock 44 is closed. The water level in the tank 54 being then above the level of the switch 81, the switch 81 is closed and the power supply 73 is connected to the switch 78 through the switch 81. Initially, the switch 78 is closed and the relay coils 74 and 76 are energised, hence the relay contacts 72 are closed and supply current to the electric motor 47, and the relay contacts 77 are closed and supply current to the valves 24 and 61 to hold them open.

With the valves 24 and 61 open and the motor 47 rotating, hot water from the district heating system is able to enter the apparatus through the pipe 21, to move through the apparatus, and to return to the district heating system through the pipe 57.

Hot water at high pressure from the district heating system therefore passes through the pipe 21 to the hydraulic motor 26. The incoming water does work on the motor 26 and drives the motor 26 and the pump 27. The speed of rotation of the motor 26 and pump 27 is controlled and kept constant by the electric motor 47 which is geared to them and which runs at a constant speed. The work done by the water on the motor 26 reduces the water pressure. After leaving the motor 26 the water passes through the pipe 39 to the tank 41, which is unpressurized.

From the tank 41 the hot water passes by gravity to and through the domestic heating system, and thence through the pipe 53 to the tank 54. The pump 27 meanwhile rotates and draws water out from the tank 54 through the pipe 56. The water leaves the tank 54 at low pressure and the pump 27 does work upon the water and raises it to a high pressure suitable for connection to the return main of the district heating system. Water therefore leaves the pump 27 at high pressure and passes through the pipe 57 back to the return main via the non-return valve 58, the temperature sensor 59 and the solenoid valve 61.

The counter and multiplier 82 receives information from the transducer 52 concerning the number of revolutions of the motor 47. Since the motor 47 is geared to the crankshaft 36 of the hydraulic motor 26 and pump 27, the number of revolutions of the motor 47 gives a measure of the volume of water passing through the domestic heating system. The hydraulic motor 26 and pump 27 are positive displacement devices and therefore deliver an accurate volume of water with each revolution.

The counter and multiplier 82 also receives information from the temperature sensors 23 and 59 concerning the temperatures of the water at entry to and exit from the apparatus. The counter and multiplier 82 therefore receives sufficient informatin to allow metering of the quantities of hot water, and of heat, used by the dwelling.

With the apparatus operating as described above, the hydraulic motor 26 delivers water to the tank 41, which therefore tends to fill, while the pump 27 draws water from the tank 54, which tends to empty. If the heating load in the dwelling is large, the tank 41 will fill only slowly, whereas if the heating load is small the tank 41 will fill relatively quickly. In either case there will come a time when the tank 41 has filled to its pre-determined high point. At this moment, the float switch 78 opens, thus de-activating the relay coil 74 and the slugged relay coil 76.

The de-activation of the relay coil 74 causes relay contacts 72 to open. Therefore the electric motor 47 decelerates to rest. This causes the hydraulic motor 26 and the pump 27 also to decelerate to rest. No further water is delivered to the tank 41 by the motor 26, nor is further water drawn from the tank 54 by the pump 27.

Since the relay coil 76 is slugged, its deactivation is delayed and takes effect after that of the relay coil 74. The deactivation of the relay coil 76 causes the relay contacts 77 to open, thus de-energising the solenoid valves 24 and 61 and causing them to close. The closing of the valves 24 and 61 takes place after the motor 47 has stopped, thus avoiding hydraulic hammer.

When the tank 41 has filled to its pre-determined high point, therefore, water is prevented from entering or leaving the apparatus. Water is also prevented from passing through the motor 26 or the pump 27. The water in the tank 41 drains by gravity into the tank 54 via the heating system of the dwelling.

Once the water from the tank 41 has emptied by this means to its predetermined low point, the float switch 78 closes, activating the relay coil 74 and the slugged relay coil 76. The relay coil 74 closes the contacts 72, switching on the motor 47. The slugged relay coil 76 closes the contacts 77, thus energising and opening the solenoid valves 24 and 61. Hot water is then once again allowed to enter the apparatus from the district heating system and passes through the hydraulic motor 26 to the tank 41 and the cycle begins again.

As explained above, when the relay coils 74 and 76 are de-energised, there is a delay in the de-energisation of the slugged relay coil 76 and hence the valves 24 and 61 are closed after the motor 47 has stopped. The energisation of a slugged relay coil, however, is immediate, so the relay coils 74 and 76 are energised immediately and the solenoid valves 24 and 26 are opened at the same time as the motor 47 is switched on.

While the electric motor 47 is rotating, the hydraulic motor 26 and pump 27 rotate together. Their swept volume is the same, so the volume of water admitted by the motor 26 is equal to the volume pumped out by the pump 27. However the water pumped out by the pump 27 has given up heat to the dwelling and is therefore at a lower temperature and hence of a high density. Over a period therefore, a greater mass of water will be pumped out by the pump 27 than is admitted by the motor 26, and the amount of water in the system will gradually decrease.

Eventually the reduced amount of water in the system will be such that the level of water in the tank 54 drops to the level of the low level float switch 79. The switch 79 then closes, providing power to the solenoid valve 63 and causing the valve 63 to open. Water from the pipe 57 then flows along the pipe 62 through the restrictor and through the open valve 63 into the tank 54, restoring the level of water in the tank 54 to above the level of the switch 79.

If a slow leak developed in the system, water would be lost slowly and the valve 63 would consequently be opened for an abnormal amount of time to make good the loss. Means are provided (not shown) for monitoring the amount of time that the valve 63 is open, and so detecting a slow leak from the system.

If a large leak developed in the system, water would be lost rapidly and, even with the valve 63 permanently open, the flow through the pipe 62 would not be enough to make good the loss. Hence the water level in the tank 54 would fall below the level of the low level float switch 79 and would eventually reach the level of the emergency level float switch 81.

When the water level in the tank 54 falls to that of the switch 81, the switch 81 opens, cutting off power to the switch 78 and hence to the relay coils 74 and 76. The relay contacts 72 and 77 therefore open, switching off the motor 47 and de-energising the solenoid valves 24 and 61 and causing them to close. Entry of further hot water to the apparatus from the district heating system is thus prevented. The apparatus is locked stationary until additional water is admitted to it by means of the manual stop cock 44. This would not be done until the leak had been located and cured.

If the apparatus were to cease operating, e.g. as a result of failure of the electricity supply, the solenoid valves 24 and 61 would close so that no water could enter or leave the apparatus. The electric motor 47 would stop and with it the hydraulic motor 26 and pump 27, so that no water could pass through the motor 26 or the pump 27. However the water in the tank 41 would drain by gravity through the heating system of the dwelling into the tank 54.

Means are provided to prevent the tank 54 from overflowing into the dwelling under these circumstances. This could be done by arranging for the tank 54 to be of sufficiently large capacity to contain all the water that would drain from the tank 41 and the heating system of the dwelling. Alternatively, a solenoid valve (normally closed) could be provided in the pipe 53 close to the tank 54. With the electricity supply working, the solenoid valve would be open, but if the electricity failed, the solenoid valve would close and prevent overflow. Alternatively a conventional overflow pipe could be provided for the tank 54, to carry any overflowing water away harmlessly.

Figure 6:
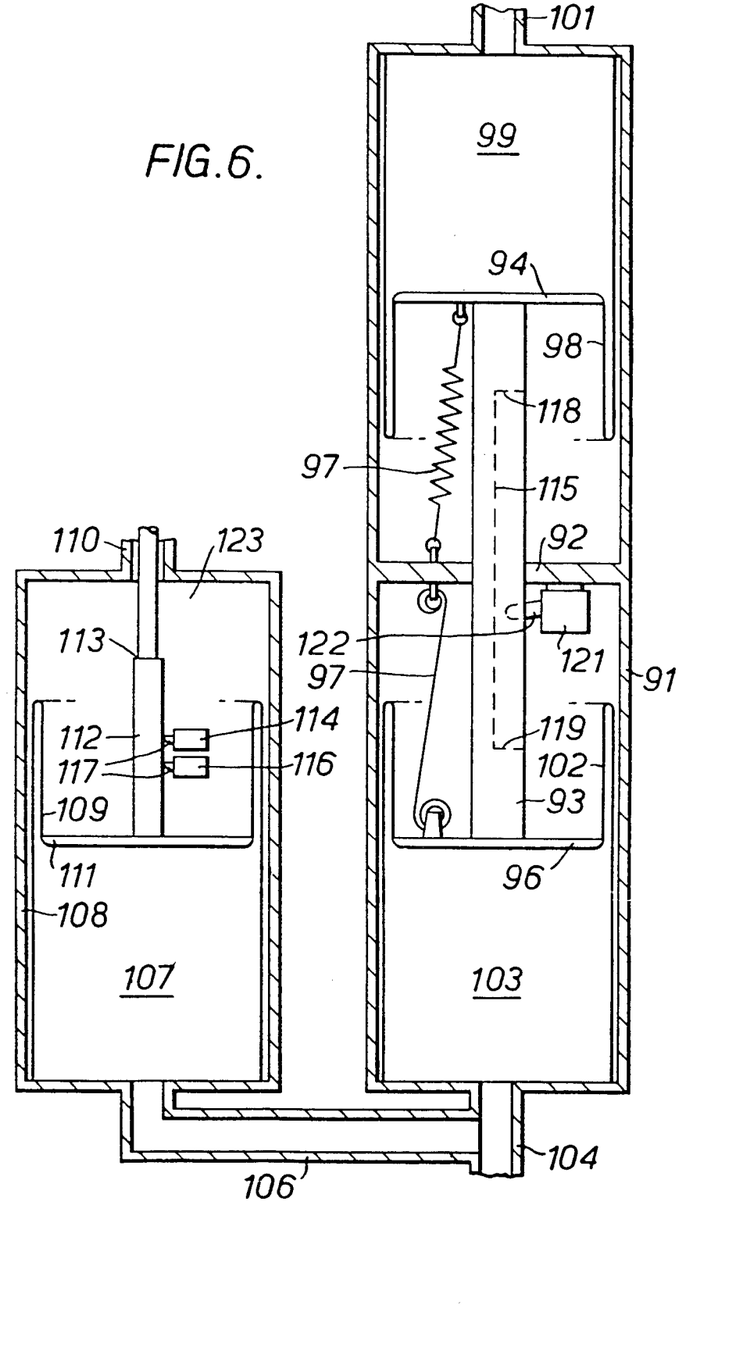
FIG. 6 is a side elevational view of an alternative to the apparatus shown in FIG. 5.

FIG. 6 shows a device which can be used in place of the buffer tanks 41 and 54 if, for example, a domestic environment makes it difficult to provide a suitable gravity head between the tank 41 and the tank 54, or if a greater pressure is needed than can be provided by gravity.

A cylinder 91 is divided into two halves by a central plate 92. A piston rod 93 is mounted for sliding movement through the plate 92 and carries pistons 94 and 96 at its ends. The pistons 94 and 96 are connected to the plate 92 by constant force springs 97 which apply a constant upward biasing force to the assembly of the pistons 94 and 96 and the piston rod 93. As shown in FIG. 6, there is present one Flexator (Registered Trade Mark) and one Tensator (Registered Trade Mark) constant force spring. It is not necessary to have two such springs, one or both can be present as desired.

The piston 94 carries a Bellofram (Registered Trade Mark) rolling diaphragm 98 which provides a leak-proof seal against the cylinder 91 as the piston 94 moves up and down within the cylinder 91. Thus the diaphragm 98 and the cylinder 91 define a chamber 99 of variable volume. A pipe 101 connects the chamber 99 to the output side of the hydraulic motor 26 (FIG. 1). The piston 96 similarly carries a Bellofram rolling diaphragm 102 which provides a leak-proof seal against the lower part of the cylinder 91, as shown, and with the cylinder 91 defines a chamber 103 of variable volume. A pipe 104 connects the chamber 103 to the input side of the hydraulic pump 27 (FIG. 1). A further pipe 106 connects the chamber 103 to another chamber 107 of variable volume defined by a cylinder 108 and a Bellogram rolling diaphragm 109 carried by a piston 111 and providing a leak-proof seal against the cylinder 108 as the piston 111 moves up and down within the cylinder 108.

The piston 111 carries a piston rod 112 which is loosely guided within a pipe 110 to allow vertical sliding movement of the piston 111 and piston rod 112. The piston rod 112 has a step 113 formed in it, as shown. An upper switch 114 and a lower switch 116 are positioned beside the piston rod 112, as shown, and have plungers 117 which are biased to the left, as seen in FIG. 6, against the piston rod 112. The switch 114 is open when its plunger 117 is pushed to the right, as seen in FIG. 6. The switch 116, however, is closed when its plunger 117 is pushed to the right. As the piston 111 and piston rod 112 slide downwards, as seen in FIG. 6, the plungers 117 of the switches 114 and 116 are successively allowed to move to the left by the presence of the step 113. This has the effect, successively, of closing the switch 114 and opening the switch 116.

The piston rod 93 has a slot 115 cut in it, with a shoulder 118 at its upper end and a shoulder 119 at its lower end. A toggle switch 121 is resiliently mounted on the plate 92 and has an operating lever 122 which projects into the slot 115 in the piston rod 93. As the piston rod 93 rises and falls, the shoulders 119 and 118 contact the lever 122 of the switch 121 and thereby cause the switch 121 to change its state. When the piston rod 93 rises, the shoulder 119 raises the lever 122 to close the switch 121, and when the piston rod 93 falls, the shoulder 118 depresses the lever 122 to open the switch 121.

The pipe 110 connects a chamber 123 above the piston 111 to a cold water header tank of the dwelling.

The device shown in FIG. 6 replaces the tanks 41 and 54 shown in FIG. 1 and operates in conjunction with the rest of the apparatus shown in FIG. 1 in the following manner.

The chamber 99 corresponds to the tank 41 shown in FIG. 1 and is connected to the output side of the hydraulic motor 26 through the pipe 101 and to the input side of the heating system of the dwelling through a pipe (not shown) corresponding to the pipe 42 in FIG. 1. The chamber 103 corresponds to the tank 54 shown in FIG. 1 and is connected to the input side of the hydraulic pump 27 through the pipe 104 and to the output side of the heating system of the dwelling through a pipe (not shown) corresponding to the pipe 53 in FIG. 1.

The chamber 123 contains cold water at a low pressure imposed by the header tank of the dwelling. This low pressure is transmitted through the diaphragm 109 to the chamber 107 and thence to the chamber 103. The chamber 103 corresponding to the tank 54 is, therefore, at a low pressure, while the chamber 99 corresponding to the tank 41 is at a higher pressure, the difference between the two pressures being determined by the forces exerted by the springs 97. This difference in pressure between the chambers 99 and 103 propels the hot water through the heating system of the dwelling, and therefore corresponds to the difference in height between the tank 41 and the tank 54 in FIG. 1.

The switch 121 corresponds to the large hysterisis float switch 78 in FIG. 1. When the motor 26 delivers water to the chamber 99, the piston rod 93 is lowered. In due course it is lowered to the point where the shoulder 118 depresses the lever 122 and changes the state of the switch 121. This opens the switch 121, and corresponds to opening the large hysterisis float switch 78. The switch 121 is connected to the remainder of the apparatus in the same way as the switch 78 in FIG. 1, and opening the switch 121 has the same effect of switching off the electric motor 47 and closing the solenoid valves 24 and 61.

The motor 26 then stops delivering water to the chamber 99, and under the pressure exerted by the springs 97 water passes from the chamber 99 through the heating system of the dwelling and into the chamber 103. The piston rod 93 therefore rises. In due course it reaches the point where the shoulder 119 contacts the lever 122 and closes the switch 121. This has the same effect as closing the switch 78 in FIG. 1, and switches on the electric motor 47 and opens the solenoid valves 24 and 61.

The upper switch 114 in the chamber 123 corresponds to the low level float switch 79 in FIG. 1 and is connected to the remainder of the apparatus in the same way. Similarly the lower switch 116 corresponds to the emergency level float switch 81 and is connected to the remainder of the apparatus in the same way. Thus the switch 114 is normally open, but if the amount of water in the chambers 103 and 107 falls to a predetermined low point, the piston rod 112 drops to a position where the plunger 117 of the switch 114 passes over the step 113 in the piston rod 112 and the switch 114 closes. This has the same effect as closing the switch 79 in FIG. 1, and opens the solenoid valve 63, thus allowing water from the pipe 62 to flow into the chamber 103.

Similarly if a large leak exists in the system, the water level in the chambers 103 and 107 falls beyond the predeterined low point to an emergency level, and the piston rod 112 drops to a position where the plunger 117 of the switch 116 passes over the step 113 in the piston rod 112. The switch 116 then opens. This has the same effect as opening the switch 81 in FIG. 1, and cuts off power to the switch 78 and hence to the relay coils 74 and 76. The relay contacts 72 and 77 therefore open, switching off the motor 47 and de-energising the solenoid valves 24 and 61 causing them to close and thereby prevent water from entering or leaving the apparatus from or to the district heating system, until the leak has been located and repaired.

As an alternative to using the header tank of the dwelling to impose a pressure through the pipe 110 on the upper side of the piston 111, a constant force spring could be used to exert a downward force on piston 111. As referred to above, means (not shown) are provided for monitoring the amount of time that the valve 63 (FIG. 1) is open and so detecting a slow leak from the apparatus. If desired, these monitoring means can receive information also from the temperature sensors 23 and 59, and/or from other temperature sensors placed elsewhere in the system, and so can determine with great precision the amount of time that the valve 63 should be open in the absence of any leak.

In addition to detecting leaks out of the apparatus, the monitoring means could also detect leaks into the apparatus, e.g. a leak of untreated water into an indirect heating coil for domestic hot water. A small leak of this kind would result in the valve 63 being open for less time than normal, and the monitoring means could detect this, if necessary with great precision in conjunction with temperature sensors. A large leak into the apparatus would cause a rapid rise of water level in the tank 54. This could be stopped by means of a high level float switch in the tank 54 in series between the switches 81 and 78 and arranged to open if the water level reached it, thereby cutting off power from the switch 78 and closing the system down.

Figure 7:
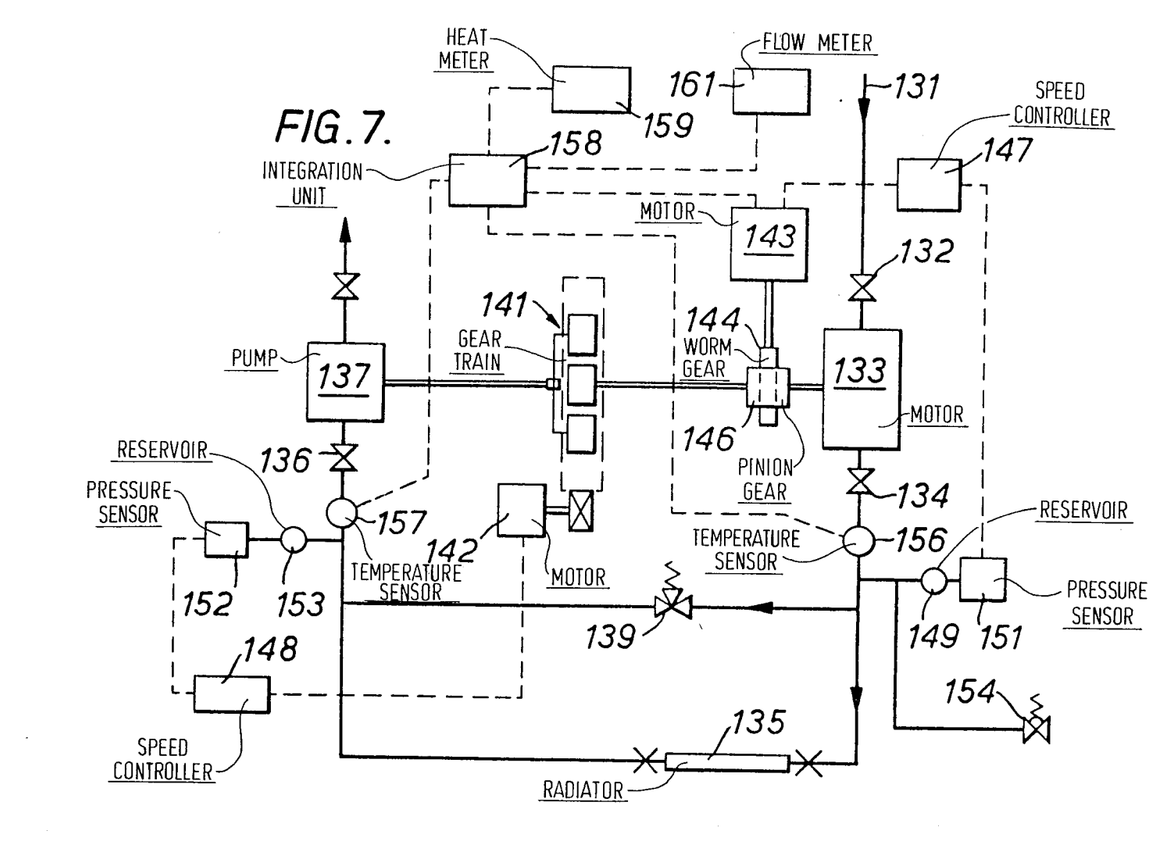
FIG. 7 is a block diagram of another embodiment of flow control apparatus.

FIG. 7 shows a schematic view of a heating system. Hot water from a combined heat and power unit, or from a district heating boiler, flows into the heating system along a pipe 131 in the direction of the arrow, and passes through a filter (not shown) and a solenoid valve 132 to a positive displacement motor 133. The hot water then passes through a flow control valve 134 to the heating system of a dwelling, represented schematically in FIG. 7 by a single radiator 135. From there the water passes through a flow control valve 136 and another filter (not shown) to a positive displacement pump 137, and thence through a non-return valve 130 and a solenoid valve (not shown) and back to the combined heat and power unit or district heating boiler. A pressure relief valve 139 may be connected across the radiator 135. Alternatively the valve 139 and its connections can be omitted.

The motor 133 and pump 137 are mounted on rotary shafts which are connected to an epicyclic gear train 141, the motor 133 being connected to the sun wheel and the pump 137 being connected to the planet wheels. The annulus of the epicyclic gear train 141 has teeth on its outside as well as on its inside, and these outside teeth mesh with a gear wheel driven by a variable speed electric motor 142.

A further variable speed electric motor 143 is connected through a worm 144 and pinion 146 to the shaft of the motor 133.

The speeds of the electric motors 143 and 142 are controlled by solid state speed controls 147 and 148 respectively. The speed controls 147 and 148 are respectively connected to pressure detectors and reservoirs 151 and 149 on the inlet side and 152 and 153 on the outlet side. A safety valve 154 is provided on the inlet side as shown.

Temperature sensors 156 and 157 are provided on the inlet and outlet sides respectively, and are connected to an integration unit 158. The integration unit 158 thus receives information about the inlet and outlet temperatures from the sensors 156 and 157; it is also connected to the motor 143 and thus received information about the flow rate through the system. A heat meter 159 is connected to the integration unit 158 and measures the heat supplied to the dwelling. A flow meter 161 records the flow of water through the system.

The flow meter 161 incorporates a flow limiting device and a trip mechanism. The flow limiting device limits the speed of rotation of the electric motor 143, and hence limits the maximum flow of water through the apparatus. The trip mechanism is arranged to stop the motor 133 under fault condition, thereby locking the motor 133 and preventing any further flow of water into the apparatus.

The operation of the apparatus shown in FIG. 7 is as follows. Water at high pressure enters the system along the pipe 131 and drives the motor 133. The motor 133 drives the pump 137 through the epicyclic gear 141. The motor 133 reduces the pressure in the water from the high pressure at which it enters the system down to a predetermined low pressure suitable for a domestic environment. The amount of pressure reduction depends on the magnitude of the braking effect applied to the motor 133 by the electric motor 143 and hence on the speed of revolution of the electric motor 143. The speed of the electric motor 143 is controlled by the speed control 147 in response to signals from the pressure detector 151. This arrangement allows complete control of the pressure in the system downstream of the motor 133 through variation in the speed of revolution of the electric motor 143.

The function of the pump 137 is to raise the water pressure from the low value present in the domestic system to the higher value suitable for the return main to the central boiler or power station. The amount of pressure increase depends on the speed of rotation of the pump 137. The pump 137 is driven by the motor 133 through the epicyclic gear train 141 and the speed or revolution of the pump 137 compared to that of the motor 133 is therefore controlled by the speed of rotation of the electric motor 142. Rotation of the electric motor 142 is controlled by the speed control 148 in response to signals from the pressure detector 152 upstream of the pump 137. This arrangement controls the speed of rotation of the pump 137 in response to the pressure upstream of the pump 137 and thereby ensures that the necessary higher pressure downstream of the pump 137 is attained.

The apparatus described, therefore, allows complete control of pressure at both the inlet and the outlet of a domestic system, by virtue of the response of the electric motors 142 and 143 to the pressure detectors 151 and 152. Under some circumstances, the work done by the motor 133 in overcoming the losses in the worm and pinion 144 and 146 and the losses in the epicyclic gear train 141, and in driving the pump 137, will be enough to reduce the incoming pressure to the predetermined low pressure required for the domestic environment. In that case, no braking effort would be required from the electric motor 143 and the rotation of the motor 143 would be in synchronism, through the worm 144 and the pinion 146, with the shaft of the motor 133. However, if the incoming water pressure downstream of the motor 133 tended to rise above the said predetermined low pressure, this would be detected by the pressure detector 151. Consequently the electric motor 143 would be slowed by the speed controller 147 out of synchronism with the motor 133 and would exert a braking effect on the motor 133. The higher the incoming pressure rise, the more the electric motor 143 would be slowed down, and the effect would be that the extra incoming water pressure would be expended on overcoming the extra braking exerted by the electric motor 143. Consequently the domestic pressure downstream of the motor 133 would be maintained at the said predetermine low pressure.

At the outlet end of the domestic system, the pump 137, as already explained, is arranged to raise the water pressure. Under some circumstances, the speed at which the pump 137 is driven by the epicyclic gear train 141 (with the electric motor 142 stationary) will be enough to raise the water pressure from a low domestic value to a high value appropriate to the return main. In that case, no movement of the electric motor 142 is required. However, changes in the rotational speed of the motor 133, or changes in water pressure, would alter this situation and would necessitate changes in rotational speed of the pump 137 to maintain the pressure downstream of the pump 137 at the correct value. Control of the pump 137 is achieved through the pressure sensor 152 and the speed controller 148, as already explained, and the arrangement is such that the rotational speed of the pump 137 varies so as to maintain the pressure downstream of the pump 137 at the correct value.

A further function of the electric motor 142 applies during start-up or during conditions of low flow through the apparatus. Where the pressure difference between inlet and outlet is considerable, and where the volume flow is large, no difficulty would be experienced, but under low flow or start-up conditions the leakage through the motor 133 and/or the pump 137 might be such as to prevent the device starting. This could be overcome by using a pump 137 with larger capacity than the motor 133, the motor 133 having a small bypass valve across it. In the embodiment illustrated, however, the problem can be overcome very simply by use of the electric motor 142 to drive the pump 137 faster than the motor 133.

The valve 139 is not essential if the reservoirs 149 and 153 are included. However, if these reservoirs are dispensed with, the valve 139 provides an intermittent path between the motor 133 and the pump 137 to deal with leakage past the motor 133 under conditions of no, or low, flow. The valve 139 is spring-loaded and is set to open at a predetermined pressure difference across it. A spring-loaded, re-settable valve 154, of the safety valve type, is arranged to allow discharge of water to waste in case of excessive surges of pressure.

To guard against electrical failure, the electric motor 143 would incorporate a pawl and ratchet mechanism such that it is locked, and will not rotate, if the electricity supply fails. In addition, spring-loaded solenoid valves, set to close on failure of the electricity supply, could be located in series with the valves 132 and 130.

In addition to operating as a pressure controller, the apparatus described also operates as a heat meter, a flow meter, and a flow limiter. The integration unit 158 receives signals from the temperature sensors 156 and 157 giving the outlet and inlet temperatures, and from the motor 143 giving the flow rate. This enables the heat meter 159 and the flow meter 161 to be actuated. Also, a flow limiting device is incorporated, in that the pressure sensor 151 if it detects a drop in pressure after the predetermined maximum flow rate (as permitted by the governor of the motor 143) has been attained, is arranged to shut down the system by locking the motor 133. Such a drop in pressure would indicate a leak and therefore the shutting down of the system would prevent the further escape of water through the leak.

The flow rate also has a predetermined maximum value when the system is working normally, since the maximum flow through the system is limited by the governor of the motor 143.

If a leak were to occur in the apparatus between the motor 133 and the pump 137, then a pressure drop would result, which would be detected by the detector 152. Consequently the rotational speed of the pump 137 would be increased relative to that of the motor 133 to make up for the pressure drop. This speed increase would enable the occurrence of the leak to be detected. The leakage rates across the motor 133 and across the pump 137 would be known, and from this the maximum possible difference, in the absence of any leak, beteen the rotational speeds of the electric motor 142 and the electric motor 143 would be known. If the difference in rotational speeds turns out to be greater than this theoretical maximum, it follows that there must be a leak. Means (not shown) are provided for detecting any such abnormal difference in rotational speeds and, on such detection, for stopping the electric motors 142 and 143, thereby locking the motor 133 and the pump 137, and closing solenoid valves in the pipes leading to and from the apparatus.

Instead of using the worm and pinion gear 144 and 146, the electric motor 143 could be coupled directly to the motor 133 and used as a brake and speed control of the motor 133. Electric control of the motor 143 would be used to achieve control of the motor 133. A pawl and ratchet mechanism would be incorporated such that the motor 133 would be brought to a halt in case of electricity supply failure.

Figures 8, 9:
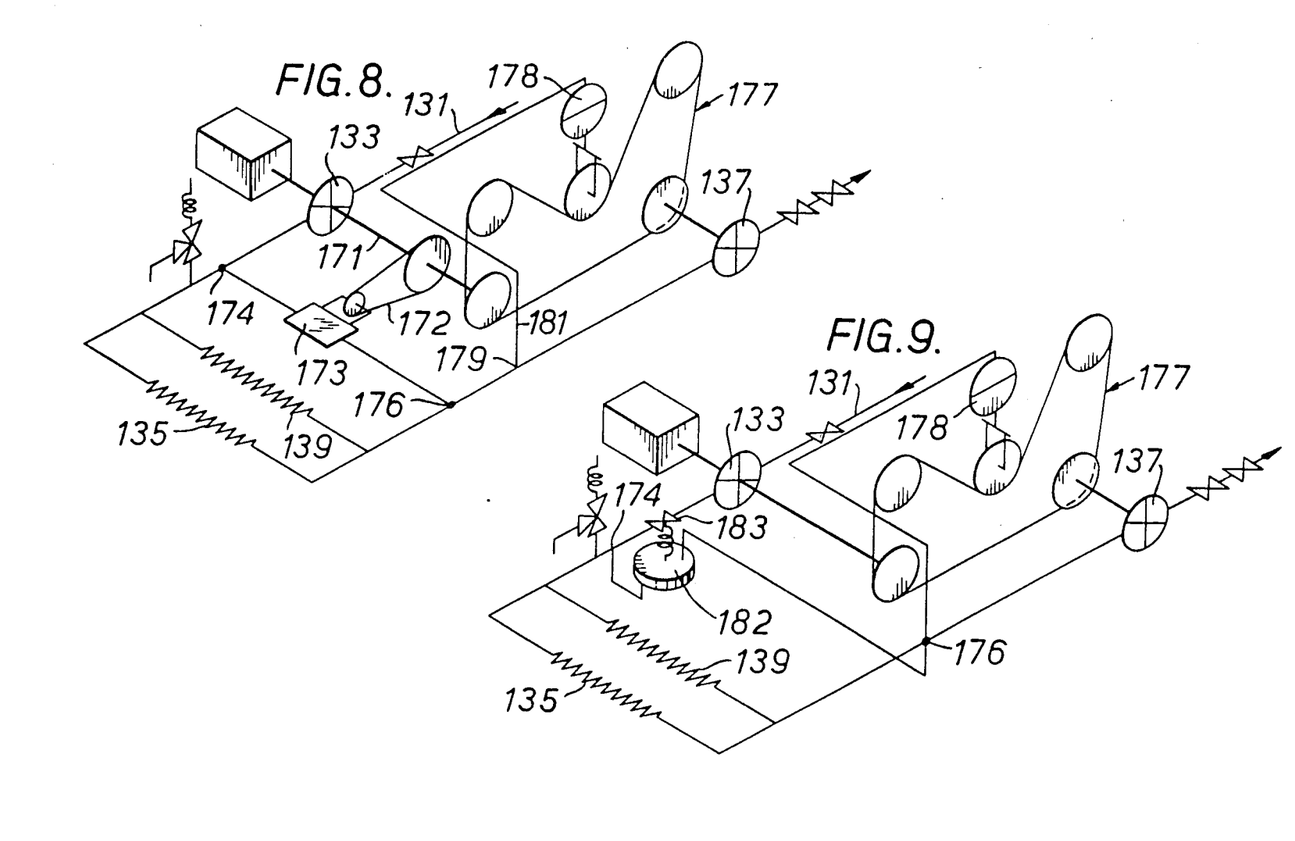
FIGS. 8, 9 and 10 are perspective views of yet further embodiments of flow control apparatus.
Figure 10:
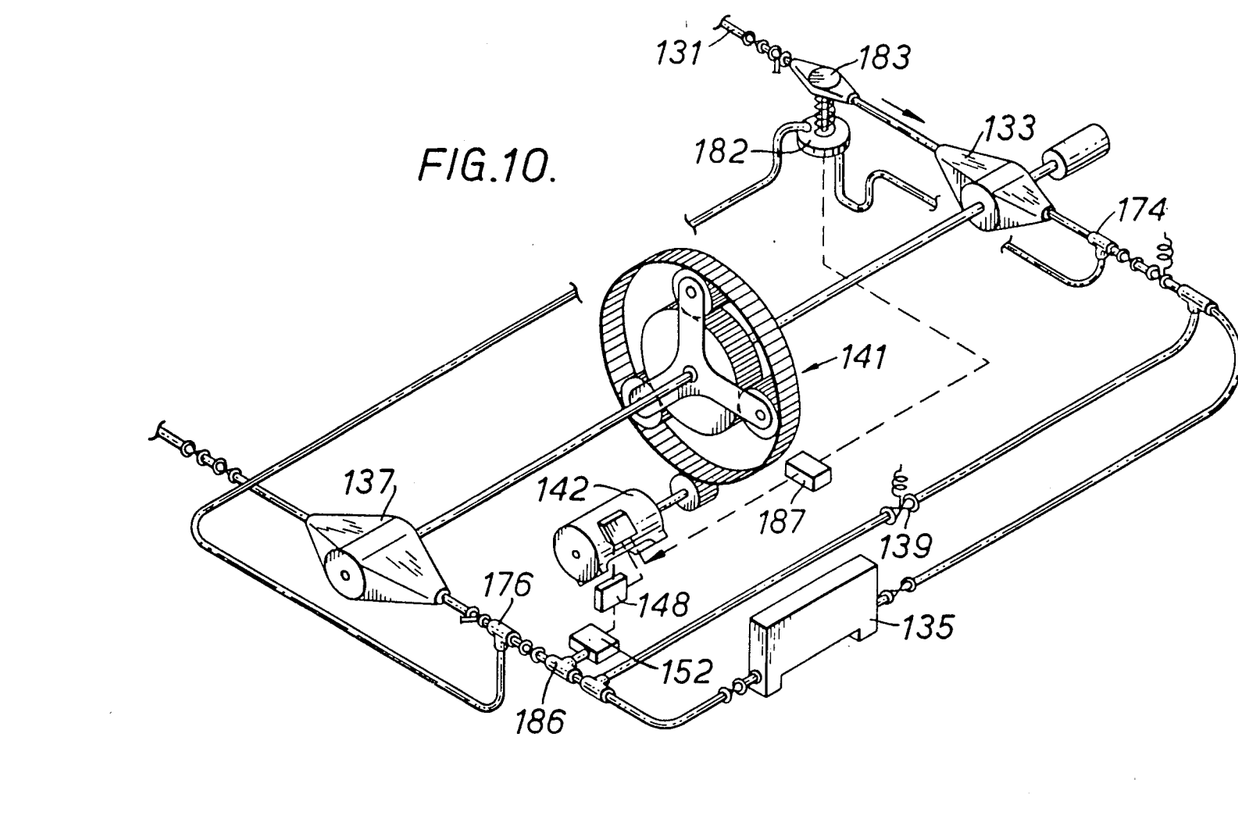

In FIGS. 8, 9 and 10, like reference numerals to those in FIG. 7 are used to designate like parts.

Referring to FIG. 8, the motor 133 and pump 137 in this embodiment do not have any external energy supplied to them, but all the energy for operating the apparatus is derived from the incoming hot water in the pipe 131. The motor 133 is connected by a shaft 171 to a brake 172. The braking torque applied by the brake 172 is controlled by a differential pressure actuator 173. The actuator 173 is connected to a point 174 downstream of the motor 133 and to a point 176 upstream of the pump 137. The actuator 173 therefore detects the difference in pressure between the points 174 and 176 and applies a braking torque to the shaft 171 which is proportional to this difference in pressure. Thereby the difference in pressure is maintained at a constant value.

The speed of rotation of the pump 137 relative to that of the motor 133 is controlled by a variable ratio device constituted by a variable speed sheave 177. The sheave 177 is controlled by a diaphragm or bellows device 178, which detects the pressure at a point 179 through a pipe 181 and moves a belt tensioner 175 upwards or downwards to vary the tension in a belt 180. The tension in the belt 180 determines the position of the belt 180 on the conical sides of pulleys in the variable speed sheave 177. The effective radii of the pulleys are thereby varied in dependence on the tension in the belt 180. Consequently the speed of rotation of the pump 137 relative to that of the motor 133 is varied in dependence on the tension in the belt 180, and therefore on the pressure at the point 179.

FIG. 9 shows a modification of the embodiment shown in FIG. 8. In this embodiment, a differential pressure controller 182 senses the pressures at the points 174 downstream of the motor 133 and 176 upstream of the pump 137. The controller 182 operates a valve 183 in dependence on the difference between these two pressures, in known manner.

The diaphragm or bellows device 178 is connected to the point 176 and controls the variable speed sheave 177 in dependence on the pressure at the point 176.

In the embodiments of FIG. 8 and FIG. 9 therefore, the differential pressure between the points 174 and 176 is sensed and controlled, and the speed of the pump 137 is controlled in dependence on the pressure in the return line from the radiator 135 to the pump 137. By controlling both the differential pressure and the return line pressure, complete control of pressure upstream and downstream of the motor 133, and upstream and downstream of the pump 137, is achieved.

If, for example, the apparatus in FIG. 8 has been operating in a steady state and the controls in the dwelling then cause a reduction in the heating circuit resistance, this results in an increased demand for water. Hence the differential pressure, or pressure at 174 minus pressure at 176, decreases. The braking torque exerted by the brake 172 therefore decreases and the variable speed sheave 177 drives the pump 137 a little faster. The speed of the motor 133 increases, allowing more water through, and more power is transmitted to the pump 137, so that the increased quantity of water flowing through the apparatus is pumped back to the return main while maintaining the pressures at 174 and 176 substantially constant.

The embodiment of FIG. 9 operates in a similar manner. In this embodiment the pressure drop across the motor 133 is reduced, therefore the leakage is less. Also the energy dissipated to control the differential pressure is recovered by the water passing through the valve 183.

In some circumstances there may be insufficient water pressure available for the motor 133 to drive the pump 137. This can be overcome by means of an electric motor arranged to drive the pump 137. The electric motor must be controlled such that its power output is proportional to the negative of the differential pressure sensed by the actuator 173 in FIG. 8. The electric motor does not operate until the brake 172 is fully off, and its speed, and therefore the speed of the pump 176, is controlled by the demand for water.

FIG. 10 shows an alternative arrangement to FIG. 9 which is similar to FIG. 7 in that it incorporates the epicyclic gear train 141 in place of the variable speed sheave 177 of FIG. 9. The differential pressure controller 182 again senses the pressure at 174 and 176 and controls the valve 183 in the input pipe to the motor 133 in dependence on the difference between these two pressures.

In the embodiment of FIG. 10 however, a source of external power is included, constituted by the electric motor 142 (which corresponds to the electric motor 142 of FIG. 7). The speed of the electric motor 142 is controlled by the solid state speed control 148. The speed control 148 is connected through the pressure detector 152 to a point 186 in the pipe between the radiator 135 and the pump 137, as shown, and so detects the pressure at the point 186 and controls the speed of the motor 142 in dependence on the pressure at the point 186.

A motor power controller 187 is connected as shown between the differential pressure controller 182 and the electric motor 142. The power controller 187 is arranged to increase the power output of the motor 142 in proportion to the negative of the differential pressure as sensed by the controller 182, that is to say, to the negative of (pressure at point 174 minus pressure at point 176).

In operation, the controller 182 responds to the differential pressure at points 174 and 176 and dissipates the excess energy of the motor 133. However, if the motor 133 with the valve 183 wide open provides insufficient power to drive the pump 173, then the electric motor 142 starts. The speed of the motor 142 will be determined by the pressure at point 186 and its power output will vary in proportion to the negative of the differential pressure as sensed by the controller 182. Thus increasing or decreasing the speed of the motor 142 increases or decreases the speed of the annulus of the epicyclic gear train 141 and hence increases or decreases the speed of the pump 137 relative to that of the motor 133. This gives complete control, in conjunction with the controller 182, of pressures throughout the apparatus.

There are two alternative ways to deal with leakage problems occurring with the apparatus of FIG. 10. Either the swept volumes of the pump 137 and motor 133 can be different, or their swept volumes can be the same and their speeds of rotation different.

An important advantage of the various embodiments described is its ability to control the pressures which exist throughout a system. Thus the water in a district heating system is at a high pressure or perhaps several tens of bars and must be reduced to a much lower pressure, no more than 3 to 4 bar, to pass through radiators in a dwelling. The differential pressure within the dwelling must be at a specific value, say 0.2 bar, to operate the domestic heating satisfactorily. Finally, the water leaving the domestic heating system is at a low pressure and must be raised to a much higher pressure before it can enter the return main of the district heating system.

Thus in a district heating system the main system distribution pumps might boost the supply main pressure to as much as 16 bars. By the end of the supply main pipe, however, i.e. at the consumer furthest from the distribution pump, the supply main pressure might have dropped to 10 bars. Whatever the supply main pressure, the apparatus described is capable of accepting it, of dropping the pressure to a suitable value for a consumer's dwelling, say 1.5 bars, of maintaing a desired constant value, say 0.5 bars, across the heating system of a consumer's dwelling, and finally of boosting the pressure of water leaving the consumer's dwelling back up to any desired value, say 9 bars, suitable for the return main of the district heating system.

Therefore, given any two pressures at the outward and return main of the district heating system, the apparatus is capable of generating from these pressures any two other desired pressures at input to and output from the domestic heating system of the consumer. In other words, given a particular average pressure between output and return main of the district heating system, and given a particular differential pressure between outward and return main, the apparatus is capable of generating any desired average pressure between the consumer's input and output and any desired differential pressure between the consumer's input and output.

The effect of the apparatus described is to provide a barrier between the high pressures commonly employed in district heating systems and the low pressures suitable for a consumer's dwelling. Since positive displacement devices are employed, they provide a complete barrier between the high and low pressure sides. This is an important safety feature. The differential pressure at high pressures which exists on the high pressure side and which is used to drive the hot water round the district heating system is transformed to a differential pressure at low pressures on the consumer's side, and is stored on the consumer's side in this form.

The apparatus described therefore allows direct connection of a district heating main to consumer's dwellings, while controlling the pressures throughout the system and ensuring complete safety. This is an important advantage, because such direct connection of the district heating main is greatly preferable to alternative methods of connection such as indirect connection through heat exchangers or a so-called direct mixing connection which involves mixing of outwardly flowing water with returning water.

The apparatus described is fail-safe and cannot run out of control. The maximum flow rate of water through the apparatus can be controlled, e.g. by the governor of the motor 143 in FIG. 7. Any burst or leak into and out of the apparatus can be detected and controlled. In the case of a large leak, the apparatus is automatically locked stationary and is isolated from the district heating system by solenoid valves.

The use of positive displacement devices makes for very low leakage through the positive displacement motor and pump. This means that the apparatus can perform very accurate metering of the fluid passing through it, for example with an error in volume terms of as little as plus or minus 0.03% of the volume of fluid passing through it. This metering of the fluid volume can be combined with measurement of input and output temperatures to give the mass of fluid passing through and the amount of heat extracted from the fluid.

Thanks to the control of pressures which the apparatus provides, the pressures within a particular installation can be lowered. This makes for easier and less expensive methods of manufacture of components, and the ability to use low cost materials, such as plastics, for components and pipework. This can reduce the frictional losses compared to metal components. The ability of the apparatus to provide controlled low pressures at consumers' dwellings means that existing radiators and pipework in the dwellings can be used, without the need to replace them with new equipment capable of withstanding high pressure.

Owing to the employment of two positive displacement devices, the static pressure forces at each cancel one another out. The apparatus therefore has only to withstand the differntial pressures in the system.

As shown in the drawings, the concept of using two positive displacement devices linked together is put into practice by arranging for incoming water at high pressured from a district heating system to enter first a positive displacement motor. The motor reduces the pressure in the water to a suitable level for a domestic heating system. A positive displacement pump linked to the motor then raises the pressure of water leaving the domestic system to a value suitable for returning the water to the return main of the district heating system.

Alternative arrangements of positive displacement devices are however possible, and advantageous in some circumstances in order to achieve control of the pressure of a fluid, such as the hot water of a district heating system. Examples follow of some of the possible alternative arrangements.

In one alternative arrangement, both of the two positive displacement devices are pumps. Water from the supply main enters the apparatus and is pumped onwards by the first positive displacement device. In due course the water reaches the second positive displacement device and is pumped by it into the return main. The two pumps are linked together and driven by a single source of power.

It is also possible for both of the two positive displacement devices to be motors. In this case the effect of both of them would be to reduce the pressure in a stream of fluid.

With the two positive displacement devices arranged as shown in the drawings, that is to say with the incoming water first entering a positive displacement motor and later passing to a positive displacement pump, the normal arrangement would be for the return pressure from the apparatus to be lower than the incoming pressure. Thus the incoming pressure from a district heating main might be 10 bars, as described above, and the return main pressure might be 9 bars.

Alternatively, however, and provided an embodiment of the invention is used which allows for external power to be supplied to the apparatus, e.g. through an electric motor, the return pressure from such a motorised version of the apparatus can be higher than the incoming pressure. If, for example, a district heating system were required to serve 100,000 consumers, it would be possible to drive the hot water around the network by means of a number of identical motorised versions of the apparatus. 1,000 such motorised versions might be sufficient. Thus, instead of needing a very high pressure at a single and very large main distribution pump, in order to propel the hot water to and from the furthest consumer, 1,000 much smaller pumps constituted by motorised versions of the apparatus could be employed. This would result in a substantial energy saving, and would avoid the need for very high pressures close to a single very large main system distribution pump.

The apparatus described, in fact, is capable of reducing the pressure of fluid passing through it, or of increasing the said pressure, or of maintaining the said pressure constant.

In another embodiment of the invention, not separately illustrated, the arrangement shown in the drawings is reversed, that is to say, the positive displacement pump receives the incoming water and does work on it to boost it to a higher pressure. Later, the water passes to the positive displacement motor, where it does work on the motor and its pressure is consequently reduced. This embodiment coul be used, for example, for connecting a district heating system to a tall building. Incoming water from the supply main is boosted in pressure by the positive displacement pump to pump it to the top of the building. After passing through the heating systems of the consumers in the building, the water returns to the bottom of the building, by which time it will be at a high pressure because of the gravity head imposed on it. It passes to the positive displacement pump, which reduces the water pressure and makes use of this pressure to drive the pump.

This reversed arrangement of pump and motor is also valuable in hilly terrain in that the pump boosts the water pressure to drive the water to the top of a hill, and the motor reduces the pressure resulting from the gravity head imposed by the hill. In this instance there would normally be no consumer's installations between the pump and the motor.

As will be appreciated, the embodiment of FIGS. 1-6 differs substantially from those of FIGS. 7-10 in that the motor 26 and the pump 27 are constrained by the electric motor 47 to rotate at only one speed, control of the passage of water through the apparatus being achieved by starting and stopping the motor 26 and pump 27 rather than by varying their speed. This has an important advantage, explained below, particularly for small installations.

For large installations, however, it is desirable to have continuously variable pump and motor speeds, in order to give better flexibility. For such large installations the embodients of FIGS. 7-10 would be suitable.

Reverting to the embodiment of FIGS. 1-6, the advantage conferred by the single speed of the electric motor 47, and hence of the motor 26 and pump 27, is that the turn-down problem is eliminated. If there is a requirement to meter a fluid at a variety of different flow rates, the accuracy of metering suffers. The inaccuracy results from leakage, and the leakage of a metering device is constant both at low and high flow rates. Therefore, at low flow rates the leakage has a much bigger effect on the accuracy of metering than it does at high flow rates. It is difficult, therefore, to provide accurate metering at a variety of different flow rates.

In the embodiment of FIGS. 1-6, however, the motor 26 and pump 27 can rotate at only one speed. The turn-down problem is therefore eliminated, the accuracy of metering greatly improved and the significance and effect of any leakage at the motor 26 and pump 27 greatly reduced.

Whereas therefore the embodiments of FIGS. 8-10 employ a substantially constant volume of water in all parts of the system and achieve control by varying the speeds of the motor 133 and pump 137, the embodiment of FIGS. 1-6 includes parts of the system where the volume of water present can vary, namely the buffer tanks 41 and 54 (FIG. 1) or the chambers 99 and 103 (FIG. 6).

It should be noted that this arrangement, with the tanks 41 or 54 or the chambers 99 and 103, is only possible because the high average pressure of the supply and return mains of the district heating system has been reduced by the apparatus described to the much lower average pressures suitable for the heating system of the dwelling. Without this reduction of average pressure, it would not have been possible to use the tanks 41 and 54 or the chambers 99 and 103. This is an important advantage of the combination of the pump 27 and motor 26 with the tanks 41 and 54, and an important consequence of the pressure controlling capability of the apparatus. Another important advantage of this combination is the avoidance of hydraulic locking. Also the embodient of FIGS. 1-6, since it runs intermittently, can operate without a bypass circuit. The embodiment of FIG. 7, as described above, also includes reservoirs and can therefore operate without a bypass circuit, although it runs continuously. The embodiments of FIGS. 8-10, however, require bypass circuits.

In the embodiment of FIGS. 1-6, the direct coupling together of the pistons 31 of the motor 26 and the pistons 32 of the pump 27 has the effect of reducing frictional and other loses, since the net force acting on the composite of one of the pistons 31 and one of the pistons 32 is the difference between the individual forces acting on each of the pistons separately.

To reduce leakage past the valves of the motor 26 and pump 27, the seatings for the valves can be made slightly resilient.

The motor 26 and pump 27 (FIG. 1) are positive displacement devices and have been described above as having pistons and cylinders. Any other form of positive displacement device, however, could be used in any of the embodiments, such as a geared device (e.g. of the Roots blower type), a vaned device, a piston device of the swash plate or radial piston type, a peristaltic device, a Wankel-type device, or any other desired form of device which is a positive displacement device.

It would also be possible for the function of the motor 26 and the function of the pump 27 to be performed by a single device. For example, a set of radial vanes mounted on a central rotary shaft could rotate in a casing divided into two parts, each part having an inlet and an outlet. In one of the two parts of the casing, the fluid entering through the inlet and leaving through the outlet could do work on the vanes, so rotating the shaft. In the other part of the casing, the vanes could do work on the fluid. Therefore, in the said one part of the casing, the device constitutes a positive displacement motor, and in the said other part of the casing, it constitutes a pump.

As described, the apparatus is suitable for controlling the flow and the pressure of hot water in district heating systems. It could also be used for controlling the flow and/or the pressure of fluids other than water, or of water or other fluids for purposes other than heating.

In yet another alternative embodiment of the invention, not separately illustrated, the apparatus consists solely of a single positive displacement device. This device could be either a pump or a turbine. In this embodiment the said single device is incorporated in a district heating system and, whereas the embodiments in FIGS. 1–10 perform the complete function of pressure control, the said single device is arranged to perform half of this complete function. The other half of the complete function could be performed by other apparatus, or by a second single device.

In another alternative embodiment, not separately illustrated, the pistons 31 and 32 of FIGS. 2 and 3 are replaced by an arrangement in which movable members corresponding to the pistons 31 and 32 are sealed within the positive displacement devices constituted by the pump 26 and motor 27. The sealing is performed by movable walls joining the movable members to fixed parts of the pump 26 and motor 27, these fixed parts corresponding to the cylinders 28 and 29. For example, the pistons 31 and 32 could be replaced by diaphragms. Alternatively movable members corresponding to the pistons 31 and 32 could be joined by bellows to fixed parts of the pump 26 and motor 27 corresponding to the cylinders 28 and 29. Or BELLOFRAM (Registered Trade Mark) rolling diaphragms could be used.

I claim:

1. Apparatus for controlling the flow of a fluid from a fluid supply at a supply pressure, including a first positive displacement device connected to the fluid supply to deliver fluid to a load at a specific load pressure different from the supply pressure, a second positive displacement device arranged to receive fluid from the load and to deliver the fluid at the supply pressure, and means to control the speed of the positive displacement devices to control at least one of the parameters of the fluid in the load including the flow of fluid therein and the load pressure, wherein the improvements comprise a first buffer container capable of containing a variable volume of said fluid connected to the delivery of the first positive displacement device, and a second buffer container capable of containing a variable volume of said fluid connected to the input of the second positive displacement device to receive fluid from the load, and wherein the control means constrain the movable members of the positive displacement devices to operate, in use, at a single, constant speed and means are provided which control the passage of fluid through the apparatus, in use, by alternation between keeping the movable members stationary and allowing them to operate at said constant speed.

2. Apparatus for controlling the flow of a fluid from a fluid supply at a supply pressure, including a first positive displacement device connected to the fluid supply to deliver fluid to a load at a specific load pressure different from the supply pressure, a second positive displacement device arranged to receive fluid from the load and to deliver the fluid at the supply pressure, and means to control the speed of the positive displacement devices to control at least one of the parameters of the fluid in the load including the flow of fluid therein and the load pressure, wherein the improvements comprise a first buffer container capable of containing a variable volume of said fluid connected to the delivery of the first positive displacement device, and a second buffer container capable of containing a variable volume of said fluid connected to the input of the second positive displacement device and switching means arranged to cause at least said one of the positive displacement devices to cease discharging fluid to the first buffer container when a predetermined greater volume of fluid is in the container, but to re-start discharging fluid into the said container when a predetermined lesser volume of fluid is in the container, said switching means being arranged to cause the said one of the positive displacement devices to cease discharging fluid and being arranged, after a delay, to cause valves to close to prevent fluid from entering or leaving the apparatus.

3. Apparatus for controlling the flow of a fluid from a fluid supply at a supply pressure, including a first positive displacement device connected to the fluid supply to deliver fluid to a load at a specific load pressure different from the supply pressure, a second positive displacement device arranged to receive fluid from the load and to deliver the fluid at the supply pressure, and means to control the speed of the positive displacement devices to control at least one of the parameters of the fluid in the load including the flow of fluid therein and the load pressure, wherein the improvements comprise a first buffer container capable of containing a variable volume of said fluid connected to the delivery of the first positive displacement device, and a second buffer container capable of containing a variable volume of said fluid connected to the input of the second positive displacement device to receive fluid from the load and wherein both said buffer containers are airtight and joined by an air duct through which air moves between them to take up the volumes in them not occupied by the fluid.

4. Apparatus for controlling the flow of a fluid from a fluid supply at a supply pressure, including a first positive displacement device connected to the fluid supply to deliver fluid to a load at a specific load pressure different from the supply pressure, a second positive displacement device arranged to receive fluid from the load and to deliver the fluid at the supply pressure, and means to control the speed of the positive displacement devices to control at least one of the parameters of the fluid in the load including the flow of the fluid therein and the load pressure, wherein the improvements comprise a first buffer container capable of containing a variable volume of said fluid connected to the delivery of the first positive displacement device, and a second buffer container capable of containing a variable volume of said fluid connected to the input of the second positive displacement device to receive fluid from the load, and wherein at least one said buffer container includes a diaphragm and a constant force spring acting on said diaphragm to pressurize said container, both said buffer containers being arranged adjacent one another and including a movable barrier between said containers such that as one container increases in volume the other container decreases in volume and vice versa.

* * * * *